United States Patent
Grosseholz (10) Patent No.: US 11,078,887 B2
(45) Date of Patent: Aug. 3, 2021

(54) METHOD FOR OPERATING A WIND FARM

(71) Applicant: Nordex Energy SE & Co. KG, Hamburg (DE)

(72) Inventor: Georg Grosseholz, Hamburg (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 16/896,935

(22) Filed: Jun. 9, 2020

(65) Prior Publication Data
US 2020/0392945 A1 Dec. 17, 2020

(30) Foreign Application Priority Data
Jun. 17, 2019 (EP) .................... 19180538

(51) Int. Cl.
*F03D 7/00* (2006.01)
*F03D 7/04* (2006.01)
*H02J 3/38* (2006.01)

(52) U.S. Cl.
CPC ............. *F03D 7/048* (2013.01); *H02J 3/381* (2013.01); *H02J 2300/28* (2020.01)

(58) Field of Classification Search
CPC ....... F03D 7/048; H02J 3/381; H02J 2300/28; H02J 3/386; H02J 3/382
See application file for complete search history.

(56) References Cited

U.S. PATENT DOCUMENTS

| | | | |
|---|---|---|---|
| 7,756,609 B2 | 7/2010 | Jurkat et al. | |
| 8,598,726 B1 | 12/2013 | Yasugi et al. | |
| 8,736,093 B2 | 5/2014 | Kii et al. | |
| 9,515,486 B2 | 12/2016 | Yasugi et al. | |
| 9,556,852 B2 | 1/2017 | Babazadeh et al. | |
| 10,539,118 B2 | 1/2020 | Jessen et al. | |
| 2009/0055030 A1* | 2/2009 | Mayor | H02J 3/46 700/287 |
| 2012/0133138 A1* | 5/2012 | Sorensen | F03D 7/028 290/44 |

FOREIGN PATENT DOCUMENTS

| | | |
|---|---|---|
| EP | 2028368 A2 | 2/2009 |
| EP | 2757250 A1 | 7/2014 |
| EP | 2824322 A1 | 1/2015 |
| EP | 2896102 A1 | 7/2015 |
| WO | 2010028954 A2 | 3/2010 |
| WO | 2018006920 A1 | 1/2018 |

* cited by examiner

*Primary Examiner* — Julio C. Gonzalez
(74) *Attorney, Agent, or Firm* — Walter Ottesen, P.A.

(57) ABSTRACT

A method for operating a wind farm having a plurality of wind turbines that are able to be driven and/or able to be set in response to a received setpoint value of a power-related electrical variable in order to output a power, wherein the method allots an amount of power to be distributed iteratively over the wind turbines taking into account minimum power limits of the wind turbines.

17 Claims, 4 Drawing Sheets

METHOD FOR OPERATING A WIND FARM

CROSS REFERENCE TO RELATED APPLICATION

This application claims priority of European patent application no. 19 180 538.1, filed Jun. 17, 2019, the entire content of which is incorporated herein by reference.

FIELD OF THE INVENTION

The disclosure relates to a method for operating a wind farm having a plurality of wind turbines, wherein the wind turbines are able to be controlled and/or able to be adjusted in response to a received setpoint value of a power-related electrical variable in order to output a power. The disclosure additionally relates to a wind farm having a plurality of wind turbines and at least one control unit.

BACKGROUND OF THE INVENTION

It is generally known to limit the overall power output by a wind farm by setting a setpoint value for this wind farm. This may be necessary for example when, due to certain circumstances (for example grid restrictions, lack of demand), the available power should not be fed into the electricity grid. Such reduced operation of the wind farm makes it necessary to provide for reduced operation of at least some of the wind turbines in the wind farm, or to shut them down completely. Various methods for regulating the output of a wind farm are known from WO 2010/028954 A2, EP 2 896 102 B1, EP 2 824 322 A1, EP 2 757 250 A1.

EP 2 028 368 B1 discloses a method for operating a wind farm, wherein a superordinate controller determines each setpoint value for the individual wind turbines depending on the current maximum possible value that the wind turbine is able to generate. The overall quantity to be provided by the wind farm is thus distributed depending on what each individual wind turbine is currently able to provide. In order to determine the individual setpoint values for the wind turbines, the maximum possible value of the wind farm is divided by the number of wind turbines in the wind farm and weighted with the quotient of the current maximum possible value of the wind turbine in question and the average of the current maximum possible values of all wind turbines. Due to the dependency of the distribution on the current maximum possible value in the wind farm, the change of one value of a wind turbine already has an effect on the setpoint values of all wind turbines. Due to the influence of the wind turbines of the wind farm on the wind field, which depends on their respective operating conditions, and the incident flow conditions that other wind turbines of the wind farm experience, the change in the wind conditions at one wind turbine may influence all other turbines. Depending on the prevailing wind conditions, this may lead to strong fluctuations in the setpoint values of the individual wind turbines and possibly to oscillation behavior in the closed-loop control, caused by interactions between the turbines. The interaction between a turbine located upstream and the wind field may lead to a change in the determined available active power of turbines located downstream. In the event of a change of the power output, turbulence is induced by pitching movements of the rotor blades, which turbulence influences the power available at downstream turbines. The change in the power output of a turbine generally changes the thrust acting on the nacelle of this turbine. The turbine may thereby be set in a pitching movement. This pitching changes the relative wind speed and thus the available active power.

SUMMARY OF THE INVENTION

It is an object of the invention to provide a method for operating a wind farm that efficiently and reliably regulates the power output of the wind farm.

The object can, for example, be achieved via a method which includes the following steps:
 a) determining an amount of power to be distributed over the wind turbines depending on a setpoint power for the entire wind farm and on minimum power limits of the individual wind turbines,
 b) generating a weighted distribution that assigns a respective portion of the amount of power to be distributed to the individual wind turbines,
 c) defining setpoint values for the wind turbines that, on the basis of their currently available power, are able to output less or exactly as much power as was assigned to them by the weighted distribution, wherein their setpoint values are defined such that these wind turbines are each controlled and/or operated to output their currently available power but at least to output their minimum power,
 d) determining a remaining amount of power still to be distributed,
 e) generating a further weighted distribution that assigns a respective portion of the remaining amount of power to the remaining wind turbines that, on the basis of their currently available power, are able to output more power than was assigned to them by the previous weighted distribution,
 f) defining setpoint values for those of the remaining wind turbines that, on the basis of their currently available power, are able to output less or just as much power as was assigned to them by the further weighted distribution, wherein their setpoint values are defined such that these wind turbines are each controlled to output their currently available power,
 g) repeating steps d) to f) until a stop condition is met,
 h) specifying the defined setpoint values for the respective wind turbines of the wind farm.

In the method, the output power of the individual wind turbines is regulated depending on a setpoint power specification for the entire wind farm. It may thus first of all be intended to specify a setpoint power for the wind farm. The setpoint power may be specified for the wind farm or the wind farm controller in the form of an external variable, for example by the operator of the transmission grid into which the wind farm feeds the active power. The wind farm controller may also determine the variable without an external setpoint value. By way of example, the wind farm controller may be configured to determine a power setpoint value depending on the grid frequency, the grid voltage and/or a power schedule. The setpoint power for the wind farm is specified as less than or equal to the available power or limited to such a value. In terms of control, this may be achieved using appropriate limiters. If the wind farm controller is in a bidirectional exchange with a grid control station superordinate to the controller, limitation is generally achieved by the wind farm controller transmitting the currently available power of the wind farm to the grid control station at regular intervals and the grid control station specifying the external setpoint value for the wind farm depending on the reported available power. A limitation may also be made in the case of the power setpoint value depending on the grid frequency, the grid voltage and/or a power schedule. By way of example, it is known to operate a wind farm with a power limitation below the available power within a dead band around the grid frequency and/or the grid voltage. If the grid variable leaves its dead band, it is possible to respond thereto by providing power from the power reserve in order to support the grid. The output power of the individual wind turbines is regulated by setpoint values being specified for these wind turbines, in particular for the control units of the wind turbines (wind turbine controllers). The setpoint values are setpoint values for a power-related electrical variable, which may for example be the power itself. The setpoint values may thus be power setpoint values, in particular setpoint values for the active power and/or the reactive power. The power does not, however, have to be specified directly as a setpoint value, but may also be specified indirectly, for example as setpoint values for the current or the voltage. The setpoint values are power-related at least insofar as the respective wind turbine can be actuated in order to output a desired power on the basis of these setpoint values. If, for ease of illustration, power is referred to as a setpoint value below, then this includes not only power setpoint values (values with the unit watts) as such, but also means other power-related values.

In summary, the method provides to distribute a setpoint power, specified for the entire wind farm, between the turbines of the wind farm depending on the minimum power of the individual turbines. The distribution is performed in particular for a reduced operation of the wind farm. The distribution is performed in weighted form, wherein the weighting may be made in accordance with different criteria, as will be explained in more detail later on. This distribution initially results in intermediate values that cannot be met on the basis of the currently available power of at least some of the wind turbines. This means that the available power of some turbines is possibly not sufficient to reach the intermediate values. This also means that the desired setpoint power for the wind farm cannot be achieved. Therefore, the currently available power of these wind turbines, but at least their minimum power, is specified as setpoint values and the remaining amount of power that cannot be produced by these turbines is allotted, again in weighted form, to the wind turbines with sufficient available power. Those turbines that are thus able to contribute more than provided for in the initial distribution take over the power output that the other turbines are not able to produce. The minimum power of the individual turbine is in this case specified as the lower limit for the respective turbine-specific setpoint values, as will be explained in more detail later on and constitutes an advantage of the present disclosure.

This is performed iteratively. Further (new) intermediate values are thus determined for the remaining wind turbines, which intermediate values are again possibly not able to be met on the basis of the currently available power of at least some of the remaining wind turbines. For these remaining turbines, their respectively currently available power is then again specified as setpoint values. With each iteration of the method, more turbines are thus driven to their maximum and thus receive setpoint values that cause them to output their currently available power. This is repeated until a stop condition is met, in particular until no more turbines are able to be driven to their maximum, that is, until the only wind turbines remaining are each able to output more power or just as much power as provided for by the intermediate values last determined for them. Specifically, the only wind turbines remaining are then those that are able to deliver their portion of the last created distribution (that is, reach their last determined further intermediate values), or that are able to provide the excess power that cannot be provided by the turbines that have already reached their maximum. The wind turbines still remaining may then receive the intermediate value determined for them as the setpoint value. The originally determined, distributable amount of power is thus distributed completely over the wind turbines and the power setpoint value for the wind farm or in particular the desired reduced operation is thereby achieved. A threshold value for the power may however also be provided as a stop condition, as will be explained in more detail later on. The remaining power difference may then be compensated based on a power measured at the grid connection point and calculating a control difference from the required farm setpoint value using a differential controller (for example a PID controller).

According to the disclosure, the setpoint values are additionally defined such that the wind turbines are controlled to output at least their minimum power. The setpoint values specified for the wind turbines using this method may thus in particular include the minimum power of the respective wind turbine as the lower limit. The minimum power of a wind turbine is in this case understood to be in particular a turbine-specific current minimum active power limit ("current minimum power limit", CMPL). $CMPL_j$ in this case hereinafter denotes the CMPL of the turbine j. CMPL indicates, for the current operating state of a wind turbine, what minimum active power the wind turbine should produce. External setpoint value specifications for the wind turbine are permissible only when these are specified as greater than or equal to CMPL. If a wind turbine receives setpoint values below CMPL, this wind turbine was either previously limited to a fraction of its available power, which led to the previously described oscillation behavior in the wind farm, or the wind turbine was deactivated without preference having been given to selected wind turbines in the process. The $CMPL_j$ are transmitted continuously to the wind farm controller by the individual wind turbines.

The term should be understood to mean that the value basically depends on the configuration of the wind turbine (=design), but ultimately on the current operating state and the loads and effects occurring. For example, the transmission of a wind turbine may be the dimensioning component for the minimum active power, for example if roller bearings are used therein as transmission bearings. Other bearings used in the wind turbine, such as that used to support the main shaft of the wind turbine, may also have a dimensioning effect.

During nominal operation, rolling elements have a defined behavior in their running zones, wherein a defined radial force acts on the rolling elements. Operating states that are critical for such a bearing and that may lead to damage on the bearing are present for example when only a small torque is present at high rotational speeds, that is, only a small amount of power is fed in. The high rotational speed at low load leads to undefined states of the rolling elements in the roller bearing, which are referred to as bearing slip. This may lead to a rupture of the oil film between the rolling element and bearing raceway. The lack of a lubricating film leads to direct contact between the rolling element and the bearing raceways and to a transfer of material between the rolling elements and the raceway or abrasion and, over time, to damage to the bearing.

In order to avoid such damage and costs brought about as a result of exchanging a defective bearing or transmission, it has to be ensured when controlling the wind turbine depending on the rotational speed that the rolling elements are subjected to a minimum radial force so that undefined slip can be reliably avoided. The torque transmitted via the bearing therefore has to be limited downwards. Requirements in terms of avoiding interaction between tooth edges in the transmission of the wind turbine may also have a limiting effect. For example, short-term fluctuations in torque, caused for example by turbulence in the wind acting on the rotor of the wind turbine, may contribute to damage on the tooth edges of transmissions.

In order to identify critical operating states and to take them into account in the control of the wind turbine, different variables may be selected as being limiting for the operation. It may be expedient, depending on the rotational speed or the wind speed, to limit the torque and thus the product of torque and rotational speed, the power. This takes into account the fact that rotational speed and torque are generally not freely adjustable and the settable operating range depends on the prevailing wind speed. The current minimum active power limit may also be specified for example depending on the current wind direction or turbulence that occurs. It is also possible to take into account different variables at the same time. If for example different profiles/look-up tables are specified for the minimum active power limit depending on the wind speed and depending on the wind direction, it is possible when specifying the minimum active power limit for example to take into account certain orientation ranges of the rotor with respect to the wind direction within which an increased occurrence of turbulence should be expected.

The current minimum active power limit may be specified for example in the form of a look-up table. Moving averages of such variables may also be used, for example the 10-minute average of the wind speed. It is also conceivable to specify wind speed ranges in which averaging is performed over durations of different lengths. Look-up tables may also be specified depending on the operating mode of the wind turbine. By way of example, for an operating mode in which a rotational speed reserve (or "spinning reserve") should be retained by some wind turbines of the wind farm, that is, the wind turbines are operated at a rotational speed higher than in a more aerodynamically optimal speed range in order to be able to briefly feed in additional control power for a short time, it may be expedient to adjust the current minimum active power limit of the wind turbines in question. Taking into account the current minimum active power limit leads to a reduction in wear of the components of the wind turbine.

Although the minimum power limits (CMPL) thus basically depend on the configuration of the respective wind turbines, that is, on their design, they may also be dynamic variables and depend for example on the operating state of the respective turbine, in particular on the current wind speed and/or on the rotational speed. According to one embodiment, the minimum power limits (CMPL$_j$) of the wind turbines may be specified depending on the wind speed and/or the rotational speed. In particular in the case of highly inhomogeneous wind conditions over the area of a wind farm, it may be the case that the currently available power of one or more of the wind turbines is less than its respective minimum power (and less than the portion assigned according to the distribution). However, these wind turbines are also controlled to output their minimum power, and thus receive in particular their respective minimum power limit as the setpoint value specification, even if they are not able to achieve this on account of the lower available power. It is thus intended that wind turbines which, on the basis of their currently available power, are not only able to output less or just as much power as was assigned to them by the weighted distribution, but also do not achieve their respective minimum power on the basis of their currently available power, will also be controlled to output their minimum power. Even if these turbines are not actually able to output their minimum power, they still contribute to the overall power output of the wind farm.

If these turbines were no longer to be taken into account for the method when they drop below their respective minimum power, these turbines would in particular not receive any production authorization, which could result in disadvantageous control effects. As mentioned at the outset, this may result in frequent deactivation procedures for wind turbines and in constantly changing setpoint values for each of the wind turbines within the wind farm, which may cause the wind turbines to oscillate in a coupled manner in unfavorable wind conditions. This is due to the fact that granting the production authorization would thus depend on the wind conditions and thus on the available power. The wind conditions are however not exactly predictable, and it would likewise be impossible to predict which turbines in the wind farm that have production authorization at the present time receive further production authorization at the next moment. This can be prevented by virtue of defining the setpoint values at least at the respective minimum power; in particular, all of the turbines initially remain activated. Any remaining amount of power may likewise be allotted to the remaining turbines, as will be explained in more detail later on.

The individual steps of the method are explained in detail below, in part together with possible refinements.

According to the disclosure, an amount of power that is to be distributed over the wind turbines of the wind farm is first of all determined in step a). This is thus a setpoint amount of power. This distributable amount of power takes into account the setpoint power that was specified for the entire wind farm and the minimum power of the individual wind turbines. According to one embodiment, the amount of power distributable to the wind turbines (hereinafter also called residual) is determined as the deviation from the setpoint power for the entire wind farm and the minimum power of all wind turbines, in particular as the difference between the setpoint power and the sum of the minimum power. In particular, $SP_p - \Sigma_k CMPL_k$ applies for the deviation, wherein $SP_p$ denotes the setpoint power of the wind farm and $\Sigma_k CMPL_k$ denotes the sum of the minimum power limits, $CMPL_j$, of all of the k wind turbines participating in the method. The wind farm may in this case include n>0 wind turbines, and j, k ∈ {1 ... n}. In other words, the CMPL of k turbines of the farm are summed. All of the turbines may in particular be summed, k=n. For the distributable amount of power, for each of the wind turbines, only the amount of power that exceeds the minimum power of this turbine is thus in particular taken into account. The minimum power of the wind turbines should not form part of the distribution, but should rather form the minimum for the respective setpoint value for each of the wind turbines participating in the method. According to the disclosure, the determination of the setpoint values, which is still to be explained, is carried out in such a way that each of the wind turbines is controlled to output at least its minimum power. If the sum of all of the minimum power limits of the individual wind turbines is greater than the setpoint value specified for the wind farm, that is, $SP_p < \Sigma_k CMPL_k$, then wind turbines may be removed from production operation. These turbines then do not have production authorization and are not taken into account for the method. Production authorization is granted or withdrawn in a separate method. Preferably $SP_p \geq \Sigma_k CMPL_k$, applies and the residual is thus in particular not negative.

The determined distributable amount of power, that is, the residual, is then distributed computationally over the wind turbines participating in the method in step b). According to one embodiment, the weighted distribution is created by determining intermediate values as the sum of the respective minimum power and the deviation multiplied by a weighting factor. In particular $V2SP_j = CMPL_j + g_j * (SP_p - \Sigma_k CMPL_k)$ applies, wherein $g_j$ denotes the weighting factor, $CMPL_j$ denotes the minimum power and $V2SP_j$ denotes the intermediate value for the turbine $j \in \{1 \ldots n\}$. Some suitable weighting factors are discussed in more detail later on. By virtue of this weighted distribution, a portion of the distributable amount of power is assigned to each of the wind turbines. This portion may however not necessarily be produced by each of the wind turbines. In turn, some of the turbines may possibly produce more power than allocated.

It is therefore then determined which of the wind turbines are able to produce that portion of the amount of power that is allocated to them. Those wind turbines that are unable to do this or that just reach this amount of power should deliver their maximum output. These turbines therefore receive a setpoint value that leads to the output of the currently available power in step c). If production authorizations are granted to turbines whose currently available power falls below their minimum power, these turbines on the other hand receive their respective minimum power ($CMPL_j$) as the setpoint value. These turbines are thus controlled to output their minimum power, even if they are not actually able to output this power. The resultant remaining amount of power may be taken into account when determining the residual to be distributed subsequently. If the remaining amount of power is not taken into account when determining the residual to be distributed subsequently, then the setpoint power is not achieved for the wind farm (even in the case of a residual that finally disappears). This remaining amount of power may then be compensated by way of a suitable differential controller (for example PID controller). In other words, the wind turbines in this step receive either their currently available power or their minimum power as the setpoint value, depending on which value is greater. The currently available power of a wind turbine in this case denotes the maximum possible power value that this turbine is able to produce based on the operating state prevailing at this time. The currently available power depends on the operating state of the turbine, for example on the wind speed prevailing at the turbine. For the wind turbines for which the previously determined intermediate value $V2SP_{j*}$ is greater than or equal to their currently available power $PA_{j*}$, that is, for which $V2SP_{j*} \geq PA_{j*}$ applies, the power $PA_{j*}$ currently available at each of these wind turbines may in particular be defined as the setpoint value. These turbines then contribute at least what they can to the overall power of the wind farm. Thus, there is normally a remaining amount of power that, although it was provided for these turbines in the weighted distribution, cannot be produced by them. If however all of the wind turbines participating in the method are able to produce just their assigned portion or are able to contribute even more, that is, if for all of the turbines $V2SP_{j*} \leq PA_{j*}$ applies, the method may already terminate here (the stop condition contained in step g), which is explained in more detail later on, is met). All of the turbines are then made to output their allocated portion of the weighted distribution via their setpoint values.

The mentioned remaining amount of power that cannot be produced by the wind turbines with currently available power of less than or equal to their respective intermediate value is then determined in method step d). The remaining amount of power is thus a sub-amount of the previously determined amount of power. In this case, according to one embodiment, the remaining amount of power still to be distributed is determined as a further deviation, specifically the deviation between the currently available power and the previously determined intermediate values. The further deviation is thus in particular the sum $\Sigma_{k*}(V2SP_{k*} - PA_{k*})$ of the differences between the intermediate values $V2SP_{j*}$ and the currently available power $PA_{j*}$ of the total of k* of the j* wind turbines for which the previously determined intermediate value is greater than or equal to the currently available power $PA_{j*}$. The remaining amount of power is also referred to hereinafter as further residual. The asterisk on the indices in this case identifies the fact that these are those wind turbines for which the previously determined intermediate value $V2SP_{j*}$ is greater than or equal to the currently available power $PA_{j*}$. This remaining amount of power (that is, the further residual) $\Sigma_{k*}(V2SP_{k*} - PA_{k*})$ is then distributed in weighted form. This further deviation may in particular be calculated across all of the turbines where $PA_j \leq V2SP_j$ including the turbines where $PA_j < CMPL_j$. According to one embodiment, the abovementioned remaining amount of power that is still to be distributed may then be determined as a deviation ($\Sigma_{k*}(CMPL_{k*} - PA_{k*})$) calculated as the sum of the differences between the minimum power values ($CMPL_{j*}$) and the respective currently available power ($PA_{j*}$) of the wind turbines whose currently available power ($PA_{j*}$) is less than the minimum power ($PA_{j*} < CMPL_{j*}$) provided for the respective wind turbine. This remaining amount of power may, as mentioned, be determined together with the determination of the remaining amount of power (that is, the residual) for the turbines where $PA_j > CMPL_j$.

As mentioned, the remaining amount of power does not necessarily have to be taken into account when determining the residual to be distributed subsequently. This may also be done at another point in the method, for example before or after step c), in particular between steps b) and c) or between steps g) and h). According to one embodiment, the distributable amount of power is corrected, in particular by a controller, depending on the remaining amount of power. The remaining amount of power may thus in particular be compensated by a suitable differential controller (for example a PID controller) of the wind farm controller. This controller may for example be configured such that, in the event of a deviation occurring between the setpoint value specification for the wind farm and the measured, achieved actual value for the output power of the wind farm, an increased setpoint value is specified for the wind farm for the next control cycle. The turbines that are able to produce additional power are thus successively brought to their available value and the wind farm is adjusted to the setpoint value.

In step e), a further weighted distribution is created that assigns a respective portion of the remaining amount of power to the remaining wind turbines that, on the basis of their currently available power, are able to output more power than was assigned to them by the previous weighted distribution. This portion of the remaining amount of power for the remaining wind turbines arises in addition to the amount of power already allocated in the previous distribution, that is, in particular in addition to the previously determined intermediate values. According to one embodiment, the further weighted distribution is accordingly created by determining further intermediate values $V3SP_{j\#}$ as the sum of the respective previous intermediate values $V2SP_{j\#}$ for these remaining turbines and the further deviation $\Sigma_{k*}(V2SP_{k*}-PA_{k*})$ multiplied by a further weighting factor $f_j$. Thus for the further intermediate values the following applies: $V3SP_{j\#}=V2SP_{j\#}+f_j*\Sigma_{k*}(V2SP_{k*}-PA_{k*})$. The hash sign on the indices identifies the fact that these are the remaining wind turbines for which the previously determined intermediate value $V2SP_{j\#}$ is greater than or equal to the currently available power $PA_{j\#}$ of these turbines. The further weighting factor may in particular be the same as the previous weighting factor, that is, $f_j=g_j$ applies. Some suitable weighting factors are discussed in more detail later on. By virtue of this further weighted distribution, a portion of the remaining amount of power is assigned to each of the remaining wind turbines. It may also be the case here that not all of the remaining wind turbines are able to produce their portion, but other wind turbines are able to produce more where possible.

In following step f), setpoint values are defined for those of the remaining wind turbines that, on the basis of their currently available power, are able to output less or just as much power as was assigned to them by the further weighted distribution. These setpoint values are in this case basically defined according to the same condition as the setpoint values defined in step c), but now with respect to the further weighted distribution, that is, in particular to the further intermediate value. The currently available power is thus defined as a setpoint value for those of the remaining wind turbines that are able to output less or just as much power as was assigned to each of them by the further weighted distribution. In this case too, no setpoint values smaller than the minimum power values are defined. According to one embodiment, for those of the remaining wind turbines for which the previously determined further intermediate value $V3SP_{j\#}$ is greater than or equal to their currently available power $PA_{j\#}$, the power $PA_{j\#}$ currently available at each of these wind turbines is defined as the setpoint value. Consequently, there continue to be wind turbines that have a currently available power that is greater than the further intermediate value, for which $V3SP_{j\#}<PA_{j\#}$ applies. An amount of power to be distributed thus still remains.

In this case, in step g), steps d) to f) are repeated until a stop condition is met. The stop condition may be that the only wind turbines remaining are those that are able to output more power or precisely as much power as was assigned to them by the further weighted distribution, that is, until there are no remaining turbines that are able to output less power than was allocated to them by the previous weighted distribution. In other words, steps d) to f) may be repeated until it is the case, for all of the remaining turbines, that $VnSP_j \leq Pk_j$, wherein $VnSPj$ are the intermediate values of the last iteration. This means that the intermediate values determined in the last iteration can be achieved by all of the turbines still remaining, because these turbines have enough available power. In step g), setpoint values may then be defined for just these wind turbines still remaining after the last iteration on the basis of the last of the weighted distributions. This may be the further or the last of several further distributions, or else the original distribution (if all of the turbines are able to output just as much power as was allocated to them by the distribution in step c), as explained above). In particular, the intermediate values $VnSP_j$ determined after the last iteration are then defined as the setpoint values for these turbines. The entire originally determined distributable amount of power is thus distributed over the turbines. The originally determined distributable amount of power is thus allotted to all of the wind turbines of the wind farm step by step. The maximum number of repetitions of the steps corresponds to the number of wind turbines of the wind farm that participate in the method, that is, have production authorization. That is, even in the case of typical wind farm sizes of a few up to several hundred wind turbines, the proposed weighted setpoint value distribution method does not pose any particular challenge in terms of a computer-aided implementation of the method. However, the method may terminate earlier. If a setpoint value can be assigned to all of the turbines after fewer repetitions, the method may already terminate here. The distributable amount of power is then already distributed over the wind turbines.

According to an embodiment, the stop condition is met when the remaining amount of power is equal to or less than a predefined threshold value. It is thus possible to specify a power threshold value such that when the remaining amount of power still to be distributed reaches or falls below this value, the method is terminated. It may be acceptable to not completely distribute the amount of power. The stop condition may also be met when the method has run through a predetermined number of iterations. The predetermined number of iterations may in particular depend on the wind conditions. For example, if from experience a certain number of iterations is enough to completely distribute the amount of power, that is, to achieve the setpoint power of the wind farm, reaching this number of iterations may be defined as a stop condition. The remaining amount of power may, as already described, be compensated by a suitable differential controller (for example a PID controller) of the wind farm controller.

Then, in step h), these setpoint values are specified for the individual wind turbines, for example transmitted to the control units of the respective wind turbines. The wind turbines implement the specification and the wind farm is put into reduced operation.

According to an embodiment, the weighted distribution and the further weighted distribution have the same weighting. According to one corresponding embodiment, the first weighting factor $g_j$ and the further weighting factor $f_j$ are identical. This simplifies the calculation method.

According to an embodiment, the weighting of the weighted distribution and/or of the further weighted distribution depends on the currently available power of the respective wind turbine, wherein wind turbines having a greater currently available power are weighted to a greater extent than wind turbines having a lower currently available power. The weighting factor may thus in particular be: $g_j=PA_j/(\Sigma_k PA_k)$. The currently available power of the respective turbine is thus weighted by the entire available power of all of the turbines. As a result, wind turbines having a greater currently available power are ultimately weighted to a greater extent than wind turbines having a smaller currently available power and are thus allocated a greater portion of the distributable amount of power or of the remaining amount of power.

The method can thereby be sped up. In addition, the wind conditions at the individual turbines can be taken into account. One disadvantage of using the currently available power of the respective turbine for the weighting is that this may result in interactions with the other wind turbines of the wind farm if the currently available power of an individual wind turbine changes.

According to a further embodiment, the weighting of the weighted distribution and/or of the further weighted distribution depends on the deviation between the nominal power of the respective wind turbine and its minimum power, wherein wind turbines having a smaller deviation are weighted to a greater extent than wind turbines having a larger deviation. The weighting factor may thus in particular be: $g_j=(PN_j-CMPL_j)/\Sigma_k (PN_k-CMPL_k)$, wherein $PN_j$ denotes the nominal power of the turbine j and $PN_k$ denotes the nominal power of the other k producing turbines of the wind farm. Wind turbines having a smaller deviation between the nominal power and the minimum power are thereby weighted to a greater extent than wind turbines having a larger deviation. Turbines having a minimum power close to their nominal power are thus weighted to a lesser extent and are thus allocated a lower portion of the distributable amount of power or of the remaining amount of power. In particular, such a weighting results in an ever decreasing weighting of this turbine with an increasing minimum power. This is particularly advantageous when the minimum power of the wind turbines is not fixed but rather specified dynamically or determined continuously from the prevailing operating conditions. By taking into account wind turbines having a low difference $PN_j-CMPL_j$ to a lesser extent, it is possible to achieve a higher dynamic in wind farm control. In addition, it is possible in particular to take into account the requirements in terms of deactivating the wind turbines at excessively high wind speeds.

According to a further embodiment, the weighting of the weighted distribution and/or of the further weighted distribution depends on the deviation between the currently available power of the respective wind turbine and its minimum power, wherein wind turbines having a smaller deviation are weighted to a greater extent than wind turbines having a larger deviation. The weighting factor may thus in particular be: $g_j=\max(0; (PA_j-CMPL_j))/\Sigma k \max(0; (PA_k-CMPL_k))$, wherein, as previously, $PA_j$ denotes the currently available power of the turbine j and $PA_k$ denotes the currently available power of the other k producing turbines of the wind farm. The restriction to the non-negative half-axis takes into account the fact that production authorization is possibly granted to turbines that have less power available than their respective CMPL. By virtue of this weighting, wind turbines having a smaller deviation between the currently available power and the minimum power (CMPL) are weighted to a greater extent than wind turbines having a larger deviation. Turbines having a minimum power situated close to their currently available power are thus weighted to a lesser extent and are thus allocated a lower portion of the distributable amount of power or of the remaining amount of power. In particular, with such a weighting the weighting of such a turbine is decreased with an increasing minimum power and/or decreasing currently available power. By taking into account the difference $PA_j-CMPL_j$ to a lesser extent, it is also possible to achieve a higher dynamic in terms of wind farm control, but it is in this case also a matter of discretion to perform the control depending on the currently available power.

According to an embodiment, the weighting of the weighted distribution and/or of the further weighted distribution depends on the nominal power of the respective wind turbine, wherein wind turbines having a greater nominal power are weighted to a greater extent than wind turbines having a lower nominal power. More powerful turbines are thus assigned a greater portion of the amount of power to be distributed.

In the case of the weighting factors described above, only the respectively involved wind turbines are always taken into account in the denominator when calculating the respective sums. That is, with regard to the weighted distribution, in particular only the wind turbines having production authorization and, with regard to the further weighted distribution, in particular only the wind turbines for which the previous respective intermediate values are smaller than the currently available power of these turbines.

The disclosure additionally relates to a wind farm having a plurality of wind turbines and having at least one control unit, wherein the control unit is configured to execute the method explained above. The explanations given with respect to the method thus apply accordingly to the wind farm. The at least one control unit may be a control unit superordinate to the wind turbines, in particular a wind farm controller. The superordinate control unit may thus determine the setpoint values and transmit these in particular to the control units of the individual turbines. However, one or more of the control units of the individual wind turbines may also be configured to execute the method. The variables required to determine the setpoint values are present in the form of input variables for performing the method at the superordinate control unit. By way of example, the wind turbines or their control units may be configured so as to determine currently available power values and minimum power values at regular intervals and to transmit them to the superordinate control unit. Some variables may alternatively also be stored or determined in the superordinate control unit. By way of example, nominal power values may be stored in the superordinate control unit. It is however also conceivable for the wind turbines to be configured so as to transmit current measured values and state variables to the superordinate control unit in real time or approximately real time and for the variables required for the method to be calculated in the superordinate control unit. The behavior of the individual wind turbines may in this case be virtualized on the central control unit. Corresponding solutions for such model-based or observer-based control are known from the prior art and can easily be combined with the method of the present disclosure by a person skilled in the art in the field of control technology.

BRIEF DESCRIPTION OF THE DRAWINGS

The invention will now be described with reference to the drawings wherein.

DESCRIPTION OF THE PREFERRED EMBODIMENTS OF THE INVENTION

Unless specified otherwise, identical reference signs denote identical objects below.

Figure 1:
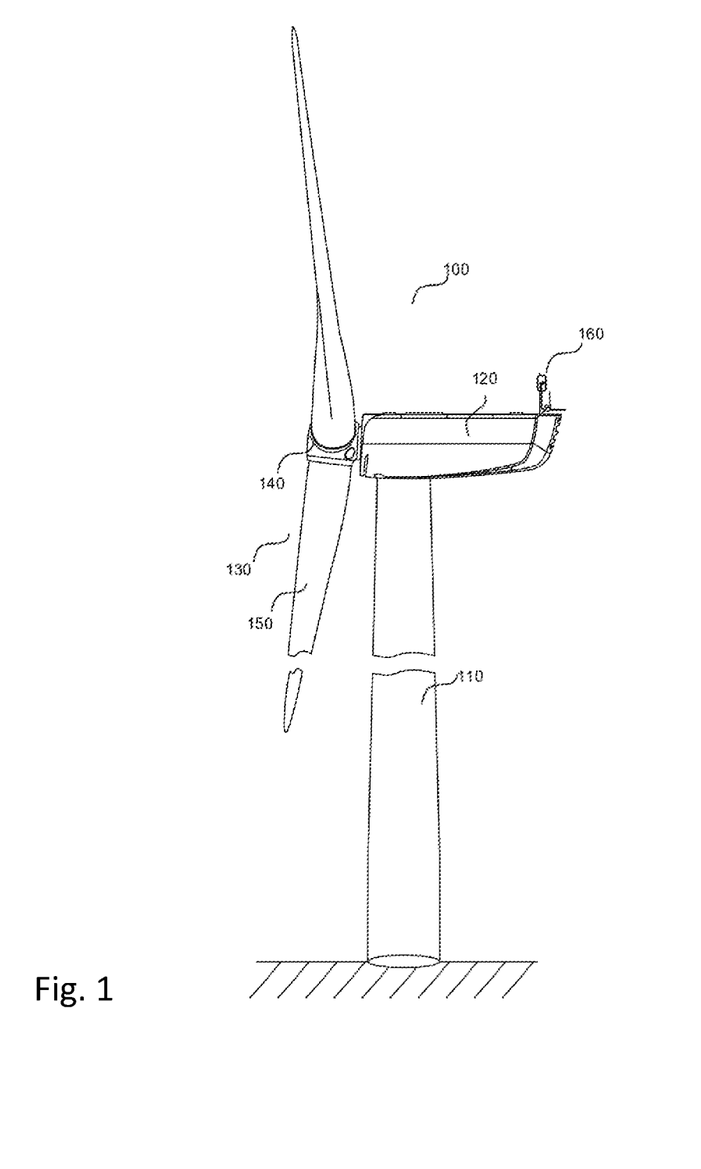
FIG. 1 shows a side view of a wind turbine.

FIG. 1 shows a wind turbine 100 having a tower 110, a nacelle 120, a rotor 130 arranged on the nacelle so as to be able to rotate and having a rotor hub 140 and rotor blades 150 extending outwards from the rotor hub 140. An anemometer 160 is additionally illustrated on the nacelle. The wind turbine 100 is suitable for the method according to the disclosure and is in particular part of a wind farm 200, as illustrated in FIG. 2.

Figure 2:
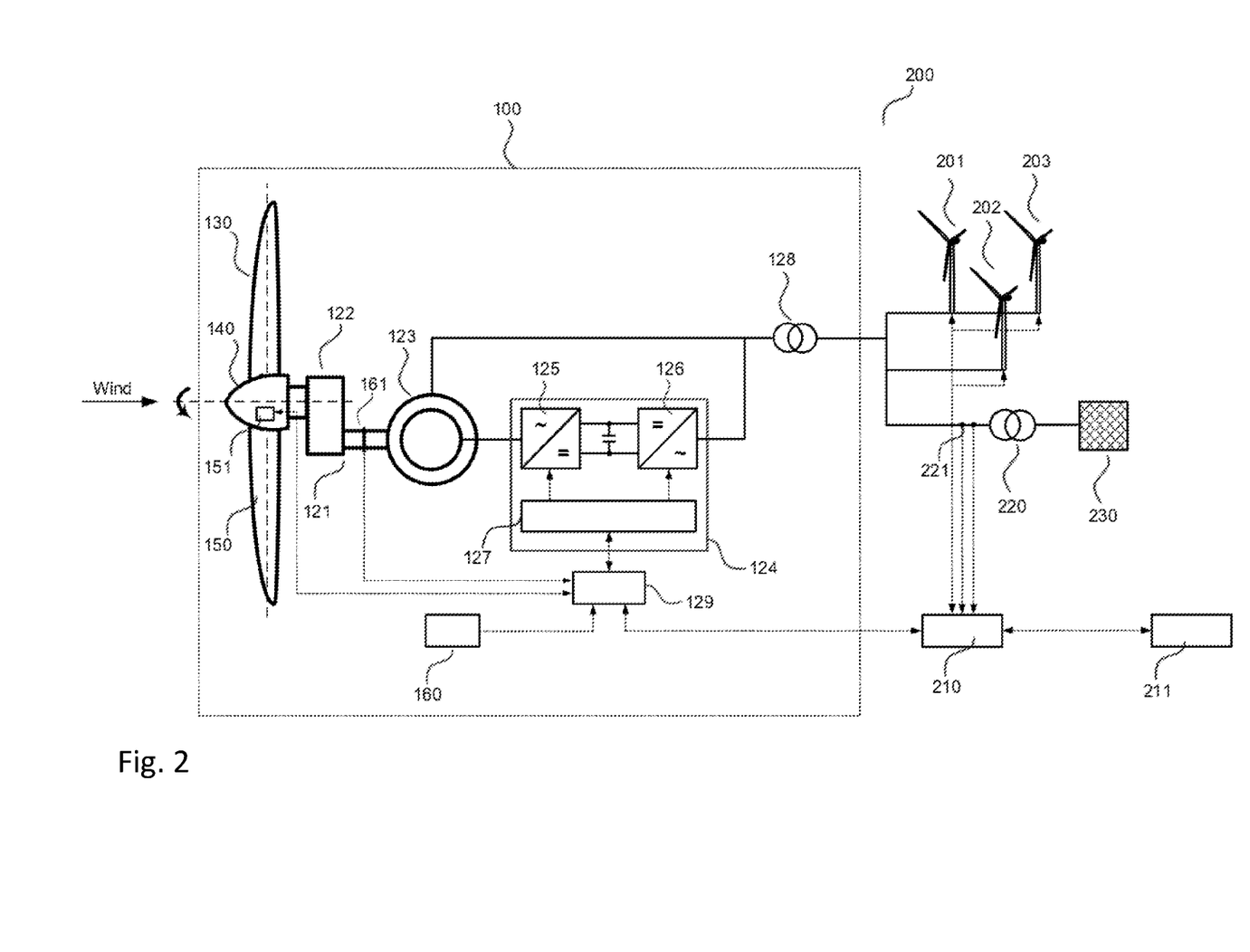
FIG. 2 shows a schematic diagram of the wind turbine from FIG. 1.

FIG. 2 schematically shows the electrical structure of the wind turbine 100. Other wind turbines 201, 202, 203, which are all part of the wind farm 200, are additionally visible. The wind turbines 100, 201, 202 and 203 are connected, via a three-phase electricity grid internal to the wind farm and a substation 220, to a three-phase electricity transmission grid 230, and are able to feed power into the latter. The substation may include a transformer that is configured to transform power output by the wind farm from a medium voltage to a high voltage. The wind turbine 100 may likewise be provided with a transformer 128 and be connected to the grid internal to the wind farm thereby.

The rotor 130 of the wind turbine 100 absorbs a torque from the wind and forwards the torque via a drivetrain 121, which includes a transmission 122, to the rotor of a double-fed induction generator 123 that is configured to convert the absorbed kinetic energy into electrical energy and feed this into the three-phase electricity transmission grid 230. The wind turbine is configured with a double-fed induction machine; the stator of the generator 123 is connected directly to the three-phase electricity supply grid 230 via a three-phase line. The rotor of the generator 123 is connected to an AC current converter 124 via a three-phase line. The AC current converter 124 is connected to the stator line and the electricity supply grid 230 at the grid side via a three-phase line. Electrical lines in the figure are illustrated schematically in single-phase form for the sake of improved clarity.

The AC current converter 124 has a rotor-side converter 125 and a grid-side converter 126. A DC link is provided between the converters. A converter controller 127 of the AC current converter 124 is configured to set a generator torque at the generator 123 via a controller for the rotor currents in the rotor. For this purpose, the converter controller 127 may preset control variables, for example for rotor currents, active and reactive power and/or generator torque, for the rotor-side converter 125. Corresponding control methods are known from the prior art. The rotor-side converter 125 sets the rotor currents and thus the generator torque by switching power electronics components, for example. In order to regulate the generator torque, the converter controller 127 communicates with a wind turbine controller 129 and in particular receives a setpoint value for a generator torque or an active power to be output therefrom.

The wind turbine 100 additionally has a rotational speed sensor 161. This may be provided at any point on the drivetrain 121, for example on a transmission output shaft that is connected to the rotor of the generator 123. Rotational speed values measured by the rotational speed sensor 161 are present in the form of input variables at the wind turbine controller 129. Wind speed readings measured by the anemometer 160 are also present in the form of input variables at the wind turbine controller 129.

The wind turbine controller 129 is also connected to a blade pitch control device 151 by way of which the wind turbine controller 129 is able to set a pitch angle of the rotor blades 150. The wind turbine controller 129 generally serves to regulate the wind turbine 100 during operation. The control and the relationship between rotational speed, torque, power, rotor blade setting angle and wind speed, in this exemplary embodiment for wind turbines with a variable rotational speed, follow methods known from the prior art. By way of example, the wind turbine controller 129 receives signals and control commands from a wind farm controller 210 with which it communicates via a data line. In the present exemplary embodiment, the wind farm controller 210, as a superordinate control unit, is configured to execute the method of this disclosure. The wind farm controller 210 is connected to a sensor 221 that is configured to record electrical measured variables at the grid connection point of the wind farm. The measured variables, for example regarding the active and reactive power output by the wind farm, are present in the form of input variables at the wind farm controller 210. Measured values regarding currents or voltages at the grid connection point may also be present in the form of input variables at the wind farm controller 210 for the control of the wind farm. The wind farm controller 210 is connected to an external control unit 211, which is owned for example by the grid operator of the transmission grid 230, via a data line. The wind farm controller 210 is configured to receive setpoint values from the external control unit 211 and to transmit actual values to it. By way of example, the wind farm controller 210 may be configured to communicate the currently available active power to the external control unit 211 at regular intervals, for example at a cycle of ten seconds. The external control unit 211 may be configured to transmit a setpoint value for the active power to be output by the wind farm depending on the prevailing available active power. As an alternative or in addition to this, the setpoint value may also be specified in response to a changed power requirement on the grid side. The reactive power may also be regulated in the same way. A power reserve may be set for example by setting a setpoint value below a value reported as being available. The external control unit 211 may also provide specifications with regard to particular modes of operation and for example specify to the wind farm controller to operate the wind farm with a rotational speed reserve. Corresponding operating modes may also be specified in the wind farm controller 210 and be set depending on measured variables measured in the wind farm or at the grid connection point.

Figure 3:
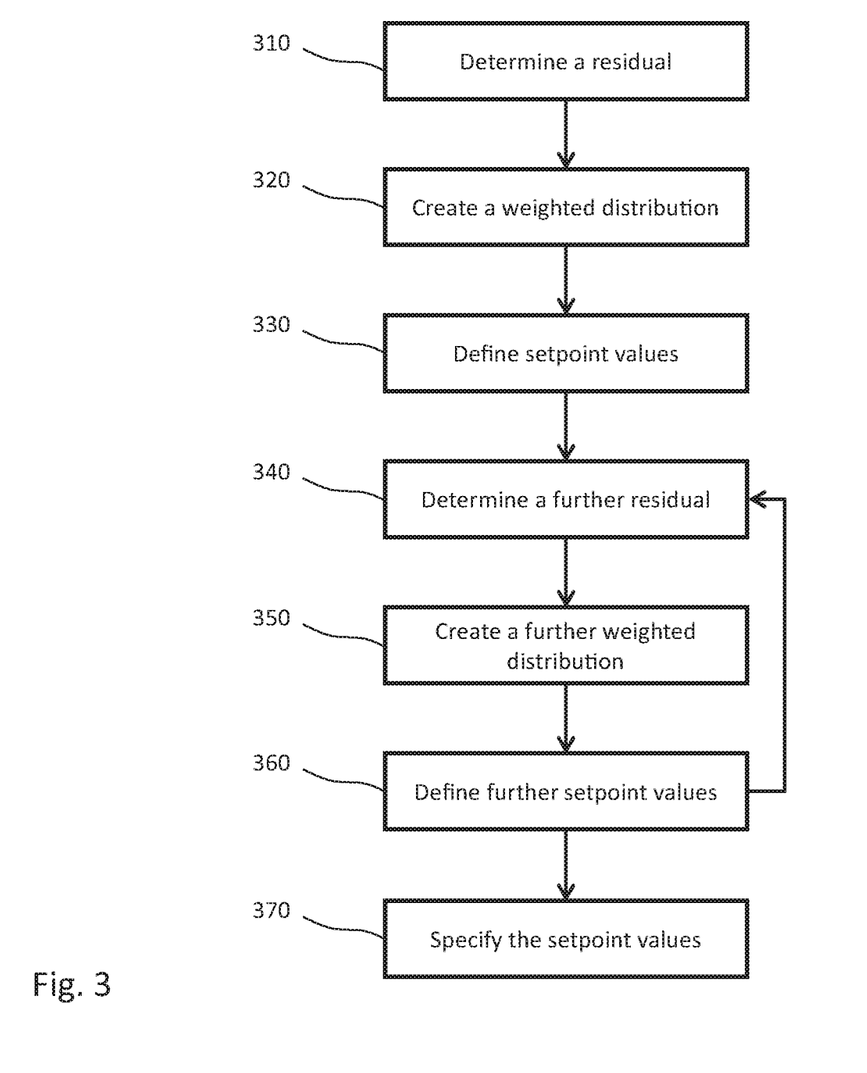
FIG. 3 shows a flowchart of the method according to the disclosure.

The sequence of the method of this disclosure is illustrated in FIG. 3. The exemplary embodiment shown there includes at least seven steps 310-370. The wind farm controller 210 executes the method, for example, when it receives a setpoint power specification $SP_p$ for the wind farm from the external control unit 211. This specification may for example request reduced operation of the wind farm. In order to achieve this reduced operation, the wind farm controller specifies power setpoint values for the wind turbines as follows.

First of all, in step 310, the wind farm controller determines an amount of power to be distributed over the wind turbines (residual) as the difference $SP_p - \Sigma_k CMPL_k$, wherein $CMPL_j$ denotes the minimum power of the turbine j and $\Sigma_k CMPL_k$ denotes the sum of the minimum powers of all of the k wind turbines participating in the method. The wind farm may include n>0 wind turbines, and j, k ∈ {1 ... n}. If the sum of all of the minimum powers of the individual wind turbines is greater than the setpoint value specified for the wind farm, that is, $SP_p < \Sigma_k CMPL_k$, then wind turbines may be removed from production operation. These turbines then do not have production authorization and are not taken into account for the method. It applies: $SP_p \geq \Sigma_k CMPL_k$, and the residual is thus in particular not negative. The residual includes only the amount of power that the wind turbines are able to produce in addition to their minimum power. The residual is then distributed over the turbines.

For this purpose, in step 320, a weighted distribution that assigns a respective portion of the residual to the individual wind turbines is created. For this purpose, intermediate values $V2SP_j = CMPL_j + g_j * (SP_p - \Sigma_k CMPL_k)$ are created, where $g_j$ is a weighting factor.

Subsequently, a first definition of setpoint values is made in step 330. For the wind turbines for which the previously determined intermediate value $V2SP_{j*}$ is greater than or equal to their currently available power $PA_{j*}$, that is, for which $V2SP_{j*} \geq PA_{j*}$ applies, the currently available power $PA_{j*}$ at each of these wind turbines is thus defined as the setpoint value. In particular, it is thus determined for each of the wind turbines, whether their respective currently available power lies below or above the intermediate value $V2SP_j$ defined for this turbine or match this exactly. Those turbines that do not reach their intermediate value receive their respective currently available power as the setpoint value. The same applies to the turbines that exactly match their intermediate value—in this case, the intermediate value corresponds exactly to the currently available power. Those turbines whose available power exceeds their intermediate value receive the remaining amount of power by the method steps that are explained below. If, however, all of the turbines reach or exceed their intermediate values, then these intermediate values are defined as the setpoint values and specified 0020 for the wind turbines. The method jumps to step 370. Each turbine thus receives a setpoint value less than or equal to its currently available power and the method may already terminate without an iteration. In this case, however, none of the wind turbines receives a setpoint value less than its minimum power. Thus, if the currently available power of a turbine is below its minimum power the minimum power, rather than the currently available power, is specified as the setpoint value. It is thereby possible, as explained above, to prevent oscillation behavior in the control system.

In step 340, a further residual is now determined, specifically the remaining amount of power that cannot be produced by the turbines that already received a setpoint value in the previous step. This further residual is in particular the sum $\Sigma_{k*}(V2SP_{k*}-PA_{k*})$ of the differences between the intermediate values $V2SP_{j*}$ and the currently available power $PA_{j*}$ of the total of k* wind turbines for which the previously determined intermediate value is greater than or equal to the currently available power $PA_{j*}$. A remaining amount of power $\Sigma_{k*}(CMPL_{k*}-PA_{k*})$ of the turbines having a currently available power below their minimum power may also be used to reproduce the residual. As an alternative, this remaining amount of power may be compensated based on a measurement at the grid connection point and calculating a control difference from the required wind farm setpoint value using a differential controller (for example a PID controller).

The further residual is then distributed over the remaining turbines with a further weighted distribution in step 350, that is, over the turbines for which applies: $V2SP_{j*}<PA_{j*}$. These remaining turbines should thus also, in addition to the previously determined intermediate values, receive their portion of the further residual. Further intermediate values $V3SP_{j\#}$ are thus determined, where $V3SP_{j\#}=V2SP_{j\#}+f_j*\Sigma_{k*}(V2SP_{k*}-PA_{k*})$ with the weighting factor $f_j$, wherein $g_j=f_j$ applies. The weighting factors are in this case preferably $g_j=f_j=(PN_j-CMPL_j)/\Sigma_k(PN_k-CMPL_k)$, wherein $PN_j$ denotes the nominal power of the turbine j and $PN_k$ denotes the nominal power of the other k producing turbines of the wind farm. Wind turbines having a smaller deviation between the nominal power and the minimum power are thereby weighted to a greater extent than wind turbines having a larger deviation. Turbines having a minimum power close to their nominal power are thus weighted to a lesser extent and are thus allocated a lower portion of the distributable amount of power or of the remaining amount of power. In particular, such a weighting results in an ever decreasing weighting of this turbine with an increasing minimum power. This is particularly advantageous when the minimum power of the wind turbines are not fixed but rather specified dynamically or determined continuously from the prevailing operating conditions. By taking into account wind turbines having a low difference $PN_j-CMPL_j$ to a lesser extent, it is possible to achieve a higher dynamic in terms of wind farm control. In addition, it is possible in particular to take into account the requirements in terms of deactivating the wind turbines at excessively high wind speeds.

In step 360, for the wind turbines for which the previously determined further intermediate value $V3SP_{j\#}$ is greater than or equal to their currently available power $PA_{j\#}$, that is, for which $V3SP_{j\#} \geq PA_{j\#}$ applies, the power $PA_{j\#}$ currently available at each of these wind turbines is defined as the setpoint value. If the previously determined further intermediate value $V3SP_{j\#}$ is not greater than or equal to its currently available power $PA_{j\#}$ for any of the remaining wind turbines, that is, if $V3SP_{j\#}<PA_{j\#}$ applies for all of the remaining turbines, the intermediate values $V3SP_{j\#}$ are each defined as the setpoint values for these remaining turbines. The amount of power still to be distributed may thus be distributed over the remaining turbines, since their available power is sufficient. Then, in step 370, all of the setpoint values defined in the previous steps are transmitted to the control units of the individual wind turbines, that is, in the present case including to the wind turbine controller 129. Otherwise (that is, if $V3SP_{j\#} \leq PA_{j\#}$ should not apply for all of the turbines), the method continues again with step 340, as indicated by the backward arrow in FIG. 3. A further residual is then determined again, a further weighted distribution is created and finally intermediate values are determined again, these being specified as the setpoint values for the turbines still remaining, provided that each of the wind turbines then has an intermediate value less than or equal to its available power. Otherwise, the method may keep returning to step 340 until this is the case.

The method of this disclosure provides a simple and reliable way of controlling the turbines of a wind farm to a predefined setpoint value for the wind farm. The minimum power limits of the individual turbines are taken into account, and in particular form minimum values for the setpoint values. Turbines for which the currently available power lies below the minimum power limit receive their minimum power instead of their currently available power as the setpoint value. This prevents undesired activation and deactivation procedures for wind turbines whose currently available power is sometimes above and sometimes below their minimum power. Due to the minimum power values being taken into account, in particular the occurrence of the coupled oscillation mentioned at the outset can be avoided.

Figure 4:
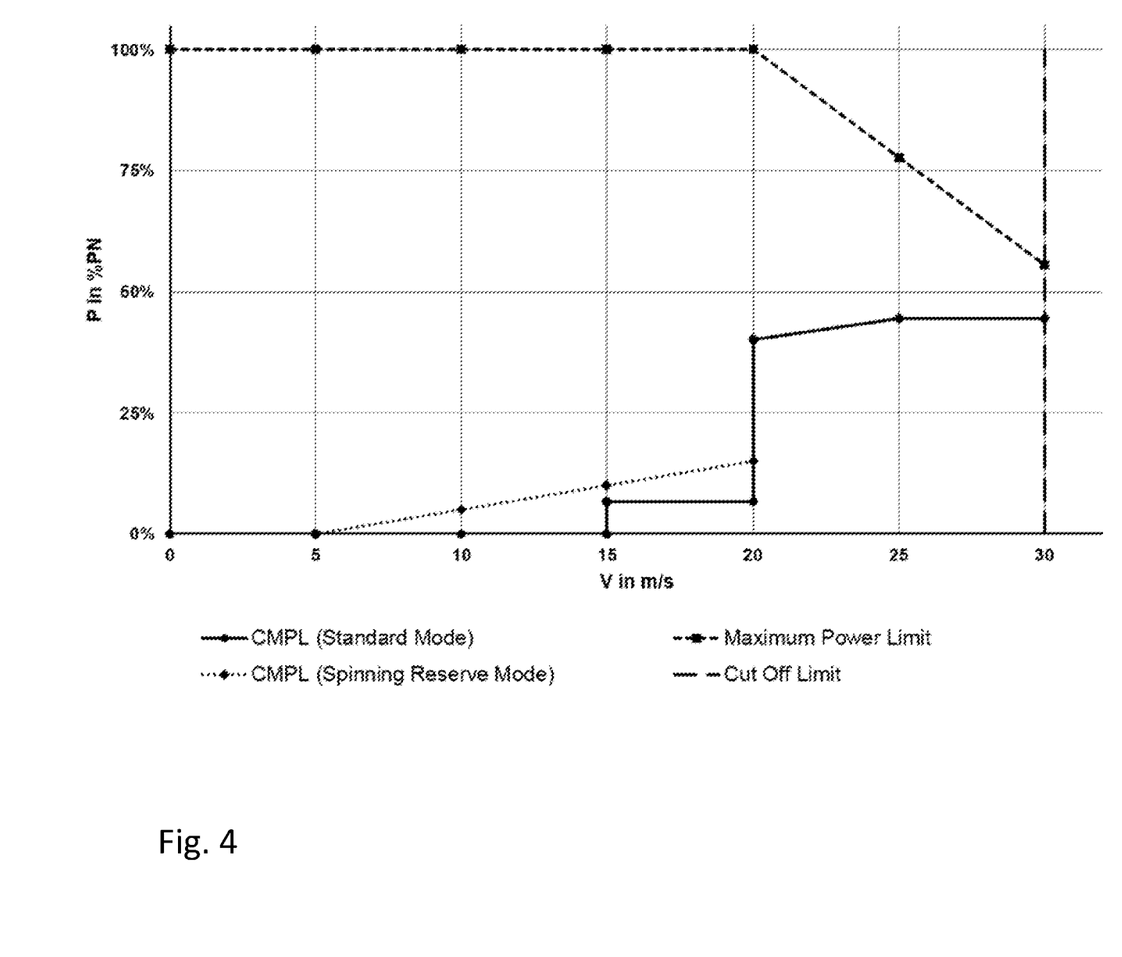
FIG. 4 shows a graph illustrating possible profiles of the minimum power and the maximum available power of a wind turbine plotted against wind speed.

The minimum power basically depends on the configuration of the respective wind turbines, that is, on their configuration. However, the minimum power may also be dynamic variables and depend, for example, on the operating state of the respective turbine, in particular on the wind speed. FIG. 4 shows the dependency of the current minimum power CMPL on the wind speed for two different operating modes of a wind turbine that has a nominal power in the megawatt range. Here the active power P of a wind turbine relative to its nominal power PN is plotted against the wind speed v. In a standard operating mode (continuous line with circular dots), the minimum power CMPL rises abruptly above the value of 0% of the nominal power at a wind speed of 15 m/s. Between 20 m/s and 25 m/s, the minimum power is set to increase linearly with the wind speed. The minimum power does not increase any further between 25 m/s and 30 m/s wind speed.

In an operating mode that retains a rotational speed reserve (dashed line with diamond-shaped dots), the minimum power CMPL rises linearly starting at a wind speed of 5 m/s. Between 20 m/s and 30 m/s, the operating mode that retains a rotational speed reserve provides the same profile for the minimum power as is provided for the standard operating mode. In this respect, the profiles of the continuous line with circular dots and the dashed line with diamond-shaped dots overlap in this interval. In principle, however, a completely different profile is also conceivable. Operation while retaining a rotational speed reserve may also be possible above 20 m/s. At 30 m/s, a vertical line represents the deactivation limit value for the turbine at which point the wind turbine is deactivated. This is also called "cut-off limit" or "storm cutoff". Starting at a wind speed of 20 m/s up to the deactivation limit value of 30 m/s, there is a linear decrease in an upper power limit value of the turbine, as may be seen with reference to the dashed line with square dots. Specifying this value places an upward limit on the available power of the wind turbine, even if the wind turbine experiences a wind speed that is above its nominal wind speed, that is, the wind speed starting from which the turbine could feed in its nominal power. The reduction is also called "soft cutout" or "storm fadeout". The reduction may also be stepped or non-linear. By way of example, a rotational speed of the rotor 130 of the wind turbine 100 may for this purpose be reduced by changing the pitch angle.

The method of this disclosure may take this changeable minimum power into account in order to control the power output of the wind turbines. Under some circumstances, wind turbines having a currently available power of less than their minimum power are thus not at all taken into account for the method, since production authorization is possibly not granted for them beforehand. On the other hand, the method does not specify any setpoint values that lie below the minimum power for the turbines.

It is understood that the foregoing description is that of the preferred embodiments of the invention and that various changes and modifications may be made thereto without departing from the spirit and scope of the invention as defined in the appended claims.

LIST OF REFERENCE SIGNS

100 Wind turbine
110 Tower
120 Nacelle
130 Rotor
140 Rotor hub
150 Rotor blade
160 Anemometer
200 Wind farm
201, 202, 203 Wind turbine
210 Central wind farm controller
211 External control unit (grid operator)
220 Substation
221 Sensor unit
230 Electricity transmission grid
121 Drivetrain
122 Transmission
123 Generator
124 Converter
125 Rotor-side converter
126 Grid-side converter
127 Converter controller
128 Transformer
129 Wind turbine controller
151 Rotor blade pitch control system
161 Rotational speed sensor
n Number of wind turbines of the wind farm with production authorization
$SP_j$ Active power setpoint value of the wind turbine j
$PA_j$ Currently available active power of the wind turbine j
$CMPL_j$ Current minimum power limit of the wind turbine j
$PN_j$ Nominal power of the wind turbine j
$SP_p$ Setpoint value for the active power to be fed in at the grid connection point by the wind farm

What is claimed is:

1. A method for operating a wind farm having a plurality of wind turbines that are adapted to be controlled in response to a received setpoint value of a power-related electrical variable in order to output a power, the method comprising the steps of:
    a) determining an amount of power to be distributed over the wind turbines in dependence upon a setpoint power for the wind farm and on minimum power limits of individual ones of the plurality of wind turbines;
    b) generating a first weighted distribution that assigns a respective portion of the amount of power to be distributed to the individual ones of the plurality of wind turbines;
    c) defining a setpoint value for each of the wind turbines that are able to output as much power as was assigned to them by the first weighted distribution or less, wherein each of the setpoint values is defined on a basis of a currently available power of a corresponding wind turbine, wherein each of the setpoint values are defined such that the corresponding wind turbines are each controlled to output the currently available power but at least to output the minimum power of the corresponding wind turbine;
    d) determining a remaining amount of power still to be distributed;
    e) generating a further weighted distribution that assigns a respective portion of the remaining amount of power to remaining ones of the plurality of wind turbines that, on the basis of a currently available power of corresponding ones of the plurality of wind turbines, are able to output more power than was assigned to them by a directly preceding previous weighted distribution;
    f) defining further setpoint values for the remaining ones of the plurality of wind turbines that, on a basis of a currently available power of corresponding ones of the plurality of wind turbines, are able to output as much power as was assigned to them by the further weighted distribution or less, wherein the further setpoint values are defined such that corresponding wind turbines are each controlled to output the currently available power of corresponding ones of the plurality of wind turbines;
    g) determining whether a stop condition for the method is met, wherein steps d) to f) are repeated until the stop condition for the method has been met; and,
    h) providing the defined setpoint values to the corresponding ones of the plurality of wind turbines of the wind farm.

2. The method of claim 1, wherein the amount of power to be distributed over the wind turbines is determined in step a) as a deviation $(SP_p - \Sigma_k CMPL_k)$ from the setpoint power for the wind farm $(SP_p)$ and the minimum power limits $(CMPL_j)$ of all of the wind turbines $(\Sigma_k CMPL_k)$.

3. The method of claim 1, wherein the first weighted distribution is generated in step b) by determining intermediate values ($V2SP_j$) as a sum of respective minimum power limits ($CMPL_j$) of the corresponding wind turbine and a deviation ($SP_p - \Sigma_k CMPL_k$) multiplied by a weighting factor ($g_j$).

4. The method of claim 3, wherein, in step c), for the wind turbines for which the previously determined intermediate value ($V2SP_{j*}$) is greater than or equal to the currently available power ($P_{aj*}$) of the corresponding wind turbines, the currently available power ($PA_{j*}$) at each of the corresponding wind turbines but at least the respective minimum power limit ($CMPL_{j*}$) of the corresponding wind turbines is defined as the setpoint value.

5. The method of claim 3, wherein, in step d), the remaining amount of power still to be distributed is determined as a further deviation ($\Sigma_{k*}(V2SP_{k*} - PA_{k*})$) calculated as the sum of the differences between respective intermediate values ($V2SP_{j*}$) and respective currently available power ($PA_{j*}$) of the wind turbines for which the previously determined intermediate value ($V2SP_{j*}$) is greater than or equal to the currently available power ($PA_{j*}$).

6. The method of claim 1, wherein a remaining amount of power that remains and is still to be distributed is determined as a deviation ($\Sigma_{k*}(CMPL_{k*} - PA_{k*})$) calculated as the sum of the differences between minimum power limits ($CMPL_{j*}$) and a respective currently available power ($PA_{j*}$) of the wind turbines whose currently available power ($PA_{j*}$) is less than a minimum power ($PA_{j*} < CMPL_{j*}$) provided for the corresponding wind turbine.

7. The method of claim 6, wherein the amount of power to be distributed is corrected depending on the remaining amount of power.

8. The method of claim 3, wherein, in step e), the further weighted distribution is created by determining further intermediate values ($V3SP_{j\#}$) as the sum of the respective previous intermediate values ($V2SP_{j\#}$) and the further deviation ($\Sigma_{k*}(V2SP_{k*} - PA_{k*})$) multiplied by a further weighting factor ($f_j$).

9. The method of claim 8, wherein, in step f), for those of the remaining wind turbines for which the previously determined further intermediate value ($V3SP_{j\#}$) is greater than or equal to the currently available power ($PA_{j\#}$) of the corresponding wind turbine, the power ($PA_{j\#}$) currently available at each of these wind turbines is defined as the setpoint value.

10. The method of claim 1, wherein the stop condition for the method is met when at least one of the remaining amount of power is equal to or less than a specified threshold value and the method has run through a predetermined number of iterations.

11. The method of claim 1, wherein the first weighted distribution and the further weighted distribution have the same weighting and/or wherein a first weighting factor ($g_j$) and a further weighting factor ($f_j$) are the same.

12. The method of claim 1, wherein the weighting of the first weighted distribution and/or of the further weighted distribution depends on the currently available power of the corresponding wind turbine, wherein wind turbines having a greater currently available power are weighted to a greater extent than wind turbines having a lower currently available power.

13. The method of claim 1, wherein the weighting of the first weighted distribution and/or of the further weighted distribution depends on the deviation between a nominal power and the minimum power of the corresponding wind turbine, wherein wind turbines having a smaller deviation are weighted to a greater extent than wind turbines having a larger deviation.

14. The method of claim 1, wherein the weighting of at least one of the first weighted distribution and the further weighted distribution depends on the nominal power of the corresponding wind turbine, wherein wind turbines having a greater nominal power are weighted to a greater extent than wind turbines having a lower nominal power.

15. The method of claim 6, wherein the amount of power to be distributed is corrected by a controller depending on the remaining amount of power.

16. The method of claim 10, wherein the predetermined number of iterations depends on the wind conditions.

17. A wind farm comprising:
a plurality of wind turbines;
at least one control unit configured to:
a) determine an amount of power to be distributed over said plurality of wind turbines in dependence upon a setpoint power for the wind farm and on minimum power limits of individual ones of said plurality of wind turbines;
b) generate a first weighted distribution that assigns a respective portion of the amount of power to be distributed to the individual ones of said plurality of wind turbines;
c) define setpoint values for a first subset of said plurality of wind turbines that are able to output as much power as was assigned to them by the first weighted distribution or less, wherein each of the set point values is defined on a basis of a currently available power of a corresponding wind turbine, wherein each of the setpoint values are defined such that said subset of said plurality of wind turbines are each controlled to output the currently available power but at least to output the minimum power of the corresponding wind turbine;
d) determine a remaining amount of power still to be distributed;
e) generate a further weighted distribution that assigns a respective portion of the remaining amount of power to a second subset of said plurality of wind turbines that are able to output more power than was assigned to them by a directly preceding previous weighted distribution based on a currently available power of corresponding ones of said second subset;
f) define further setpoint values for remaining ones of said plurality of wind turbines that are able to output as much power as was assigned to them by the further weighted distribution based on a currently available power of each of the remaining ones of said plurality of wind turbines or less, wherein the further setpoint values are defined such that said remaining ones of said plurality of wind turbines are each controlled to output the currently available power of corresponding ones of the remaining ones of said plurality of wind turbines;
g) determining whether a stop condition for the method has been met, wherein steps d) to f) are repeated until the stop condition is met; and,
h) provide the defined setpoint values to the corresponding ones of said plurality of wind turbines of the wind farm;
wherein said at least one control unit is a control unit superordinate to said plurality of wind turbines.

* * * * *